United States Patent
Lin

(10) Patent No.: US 7,029,015 B2
(45) Date of Patent: Apr. 18, 2006

(54) TRANSPORTING DEVICE WITH PANEL TRUCK

(75) Inventor: Yen-Hung Lin, Taoyuan (TW)

(73) Assignee: Syndica Technologies International Co., Ltd., Taichung (TW)

( * ) Notice: Subject to any disclaimer, the term of this patent is extended or adjusted under 35 U.S.C. 154(b) by 38 days.

(21) Appl. No.: 10/918,481

(22) Filed: Aug. 16, 2004

(65) Prior Publication Data

US 2005/0285357 A1    Dec. 29, 2005

(30) Foreign Application Priority Data

Jun. 29, 2004    (TW) .............................. 93210221 U

(51) Int. Cl.
*B62B 3/02*    (2006.01)
(52) U.S. Cl. .................... 280/47.26; 280/47.2; 280/38; 190/18 A
(58) Field of Classification Search ............ 280/47.26, 280/8, 9, 38, 37, 641, 651, 654, 47.17, 47.18, 280/47.19, 47.2, 47.34; 190/18 A
See application file for complete search history.

(56) References Cited

U.S. PATENT DOCUMENTS

| 3,314,494 | A | * | 4/1967 | Weitzner | .................... | 180/208 |
|---|---|---|---|---|---|---|
| 3,413,011 | A | * | 11/1968 | Weitzner | .................... | 280/37 |
| 3,679,223 | A | * | 7/1972 | Sakal | .................... | 280/37 |
| 5,709,400 | A | * | 1/1998 | Bonnier et al. | ........... | 280/650 |
| 5,984,326 | A | * | 11/1999 | Abraham et al. | .......... | 280/47.2 |
| 6,016,893 | A | * | 1/2000 | Chen et al. | ................. | 190/1 |
| 6,182,981 | B1 | * | 2/2001 | Kuo | .......................... | 280/37 |
| 6,425,589 | B1 | * | 7/2002 | Wu | .......................... | 280/30 |
| 6,446,987 | B1 | * | 9/2002 | Abraham et al. | .......... | 280/47.2 |
| 6,460,866 | B1 | * | 10/2002 | Altschul et al. | ............. | 280/30 |
| 6,497,311 | B1 | * | 12/2002 | Tiramani et al. | ........... | 190/115 |
| 6,540,239 | B1 | * | 4/2003 | Lee, Jr. | ................ | 280/33.993 |
| 6,688,614 | B1 | * | 2/2004 | Hsu | .......................... | 280/37 |
| 6,802,515 | B1 | * | 10/2004 | Sorenson et al. | ........ | 280/47.26 |
| 6,814,361 | B1 | * | 11/2004 | Tsu | .......................... | 280/43.1 |
| 2003/0042711 | A1 | * | 3/2003 | Hsu | .......................... | 280/651 |
| 2003/0141121 | A1 | * | 7/2003 | Flowers et al. | ........... | 180/65.1 |
| 2004/0056442 | A1 | * | 3/2004 | Ostrowski et al. | ..... | 280/87.041 |

* cited by examiner

*Primary Examiner*—J. Allen Shriver
(74) *Attorney, Agent, or Firm*—Bacon & Thomas, PLLC

(57) ABSTRACT

A transporting device has a container, a panel member, a wheel frame and two wheels. The panel member has a plate and two first linkages pivoted on the plate and on lateral sides of the container respectively. The wheel frame has two second linkages pivoted on mid sections of the first linkages respectively and the wheels are mounted on the second linkages. The panel member is moved between a collapsed position, in which the plate is attached on the container and the wheels are moved to the lateral sides of the container respectively, and an expanded position, in which the plate and the wheels are moved apart from the container. The container is provided with a shaft with a handle and a front wheel on opposite ends to control the direction of the transporting device to go. A motor and a transmission device are provided to drive the transporting device to run.

6 Claims, 6 Drawing Sheets

TRANSPORTING DEVICE WITH PANEL TRUCK

BACKGROUND OF THE INVENTION

1. Field of the Invention

The present invention relates generally to a transporting device, and more particularly to a transporting device with the panel truck.

2. Description of the Related Art

The combination of a case and a transporting device provides a convenient way of transportation. A panel truck is pivotally mounted on a bottom side of a case of a conventional luggage. To collapse the luggage, the panel truck is folded upwards and attached on a back side of the case. To expand the luggage, the panel truck is moved downwards and the case stands upright in front of the panel truck. The case is provided with a handle to be held by user to allow him/her standing on the panel truck.

The conventional luggage simply provides the panel truck pivoted on the case, so that the wheels of the truck still are exposed in the collapsed condition. The exposed part of the panel truck makes an incomplete view of the luggage and it interferes with user to carry the luggage. The case has a recess to receive the pivot arms, the panel and the wheels of the panel truck. The recess reduces the volume of the case to store goods. The recess is provided at a middle portion of the case, so that a large good is hard to be stored in the case. The conventional luggage provides the panel truck having small wheels. The small wheels are good for the collapsed condition but reduce the balance in the expanded condition.

SUMMARY OF THE INVENTION

The primary objective of the present invention is to provide a transporting device, which less space is needed to receive the truck panel.

The secondary objective of the present invention is to provide a transporting device, which has a well balance in the expanded.

According to the objectives of the present invention, a transporting device comprises a container. A panel member has a plate and two first linkages. Ends of the first linkages are pivoted on the plate and on opposite lateral sides of the container respectively to be moved between a collapsed position, in which the plate is attached on the container, and an expanded position, in which the plate is moved apart from the container. A wheel frame has two second linkages and a stop member. Ends of the second linkages are pivoted on mid sections of the first linkages respectively and the stop member is fixed on the second linkage to sustain the plate while the panel member is moved to the expanded position. Two wheels are mounted on the second linkages respectively for free rotation. The wheels are moved to the lateral sides of the container respectively via the second linkages while the panel member is moved to the collapsed position and the wheels are moved apart from the container via the second linkages while the panel member is moved to the expanded position.

DETAILED DESCRIPTION OF THE INVENTION

Figure 1:
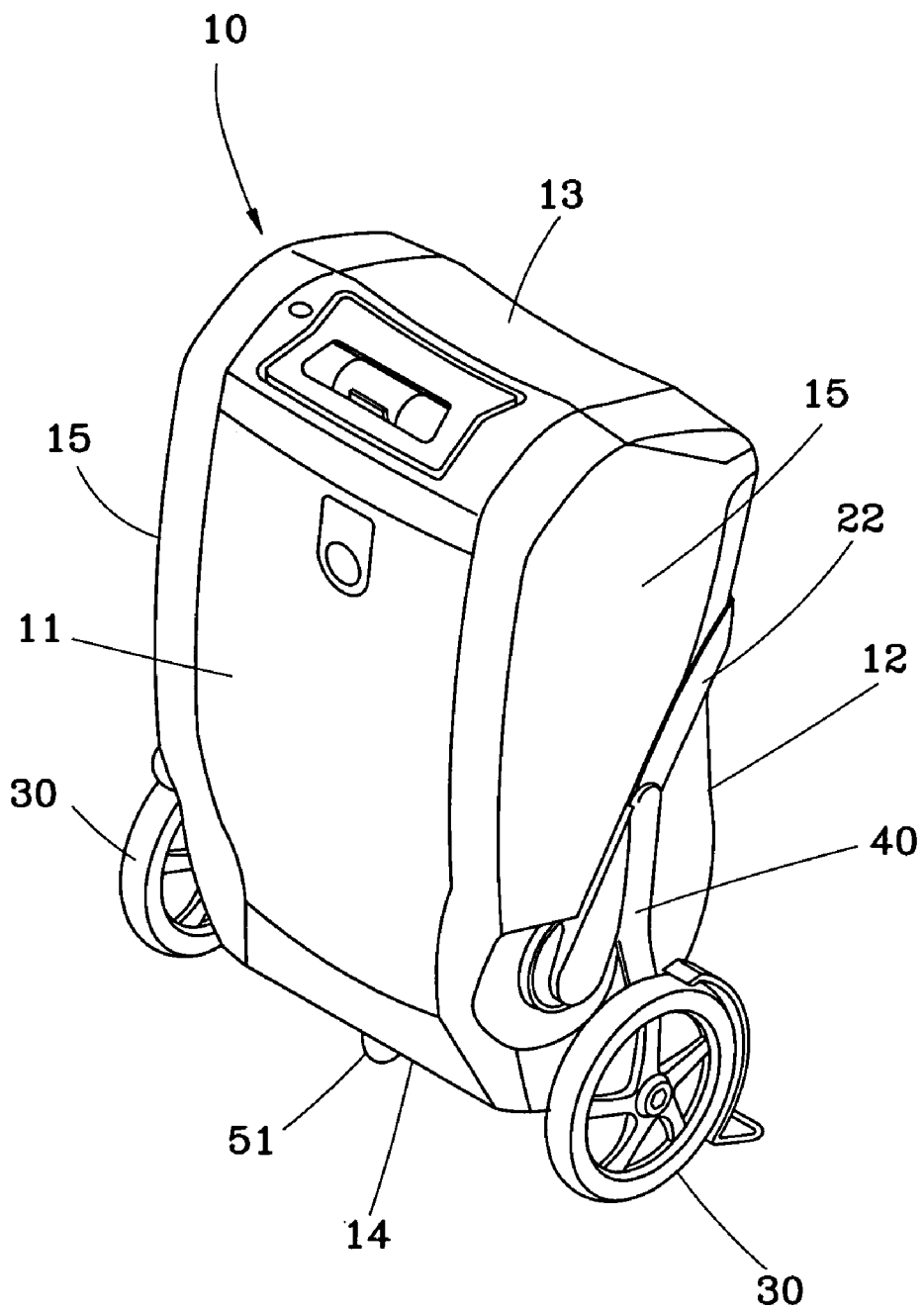
FIG. 1 is a perspective view of a preferred embodiment of the present invention in the collapsed condition.
Figure 2:
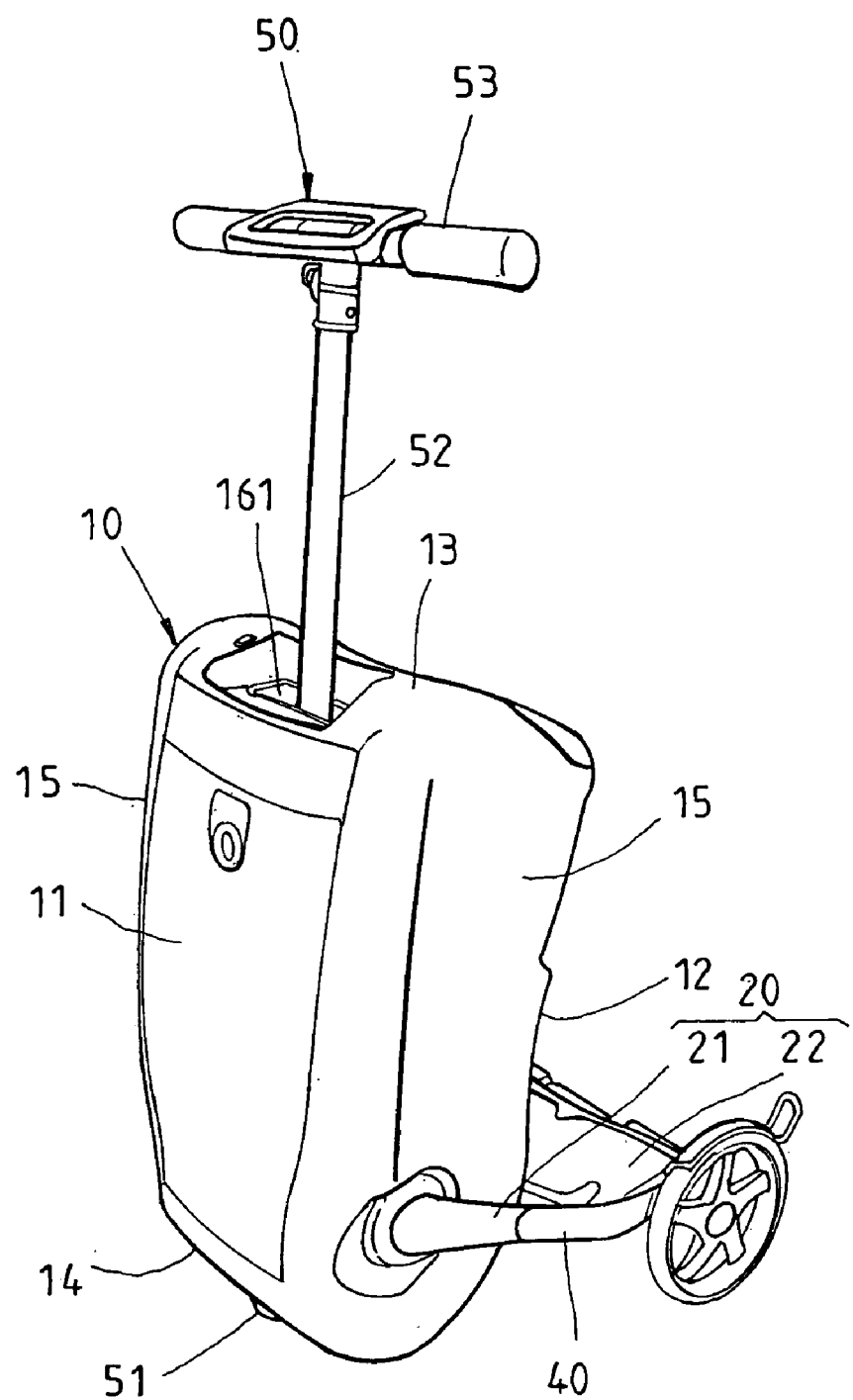
FIG. 2 is a perspective view of the preferred embodiment of the present invention in the expanded condition.

As shown in FIGS. from FIG. 1 to FIG. 8, a transporting device of the preferred embodiment of the present invention comprises a container 10, a panel member 20, at least two wheels 30, a wheel frame 40, a steering device 50 and a driving device 60.

The container 10 has a front side 11, a back side 12, a top side 13, a bottom side 14 and two lateral sides 15. The container 10 has a chamber therein, a depression portion 161 on the top side 13 and a hole 16 from a bottom of the depression portion 161 to the bottom side 14. The container 10 further has an aperture 17 at each of the lateral sides 15 (seeing FIG. 4).

The panel member 20 has a plate 21, two first linkages 22 and two torsional springs 23. Ends of the first linkages 22 are pivoted on the plate 21 and on the lateral sides 15 of the container 10 respectively. The plate 21 and the first linkages 22 are moved upward to a collapsed position, in which the plate 21 is attached on the back side 15 of the container 10, and are moved downwards to an expanded position, in which the plate 21 moves distal to the container 10. The torsional springs 23 is received in the aperture 17, in which the ends of the first linkages 22 are pivoted, to urge the first linkages 22 moving to the collapsed position in initial.

Figure 8:
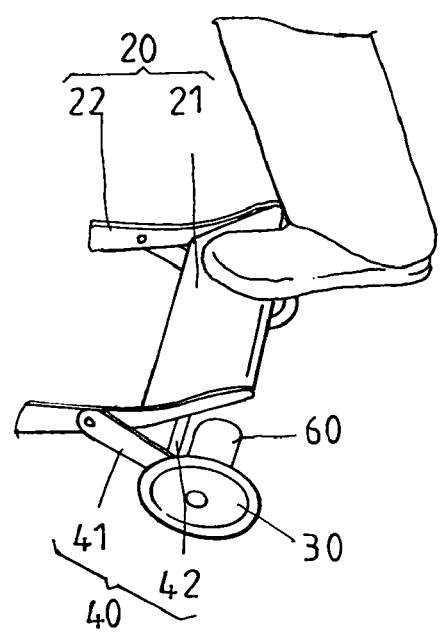
FIG. 8 is a perspective view of the panel truck of the preferred embodiment of the present invention, showing the panel member being stepped downwards.

As shown in FIG. 8, the wheel frame 40 has two second linkages 41 and a stop member 42. Ends of the second linkages 41 are pivoted on mid sections of the first linkages 22 respectively. The wheels 30 are mounted on distal ends of the second linkages 41 for free rotation. The stop member 42 is a bar having opposite ends bonded to mid sections of the second linkages 41 respectively. A distance between the stop member 42 and a connection position of first linkage 22 and the second linkage 41 is identical to a distance between the plate 21 and the connection position of first linkage 22 and the second linkage 41, such that the stop member 42 sustains the plate in the expanded position.

Figure 3:
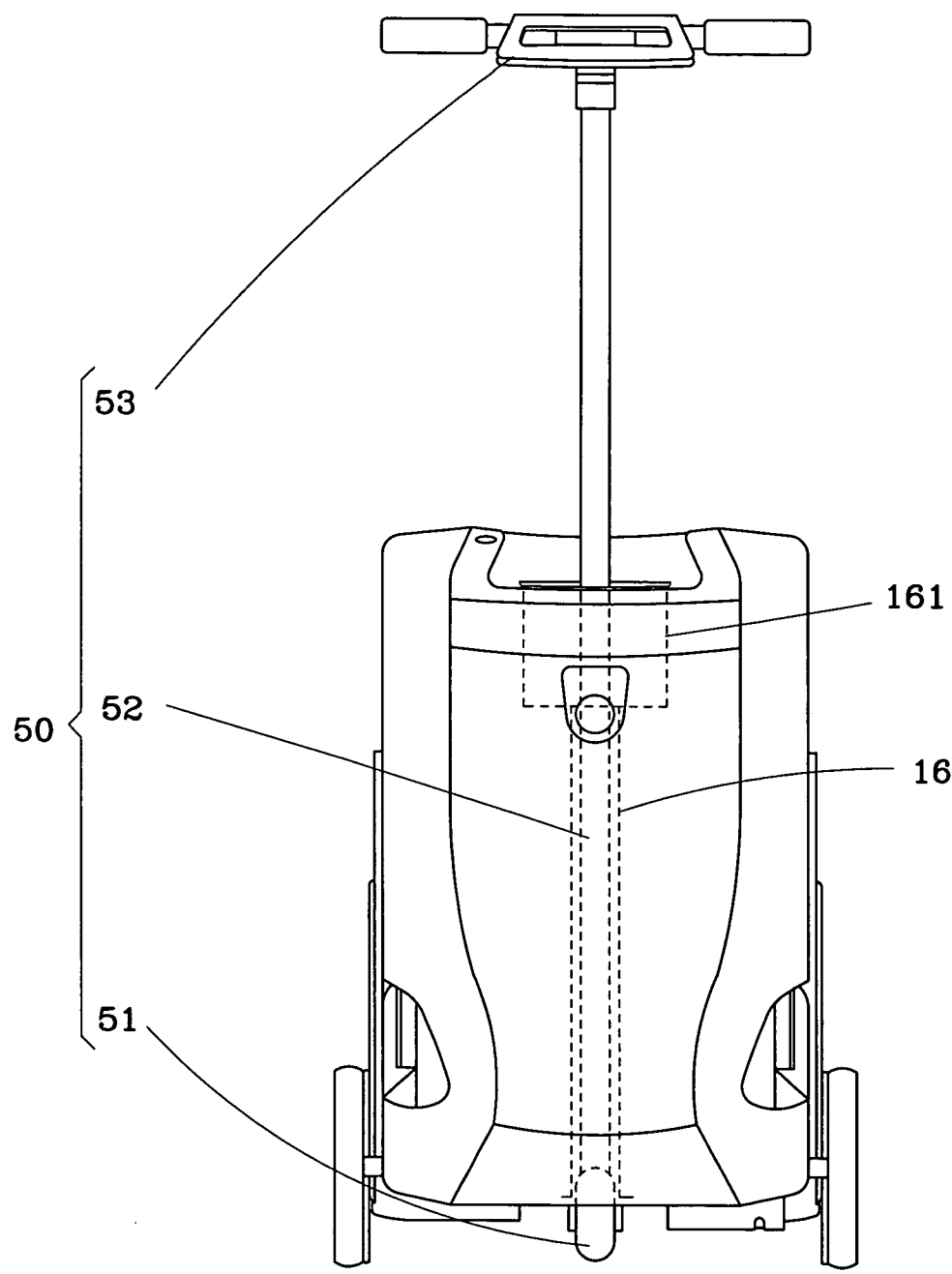
FIG. 3 is a front view of the preferred embodiment of the present invention in the expanded condition.
Figure 4:
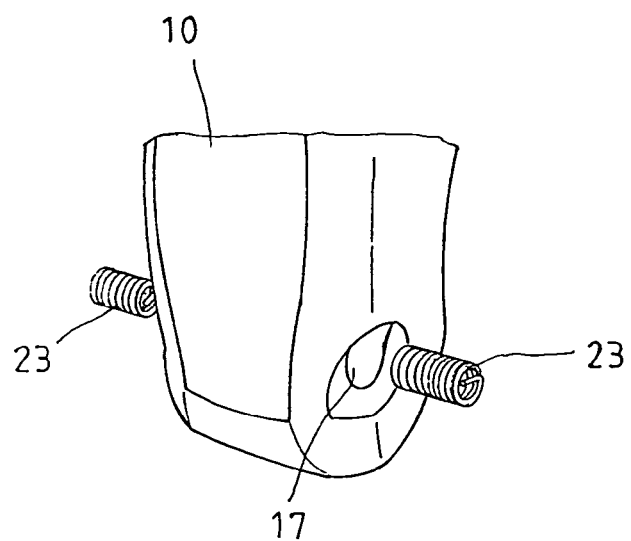
FIG. 4 is an exploded view in part of the preferred embodiment of the present invention, showing the springs and the pivot portion of the panel member.
Figure 5:
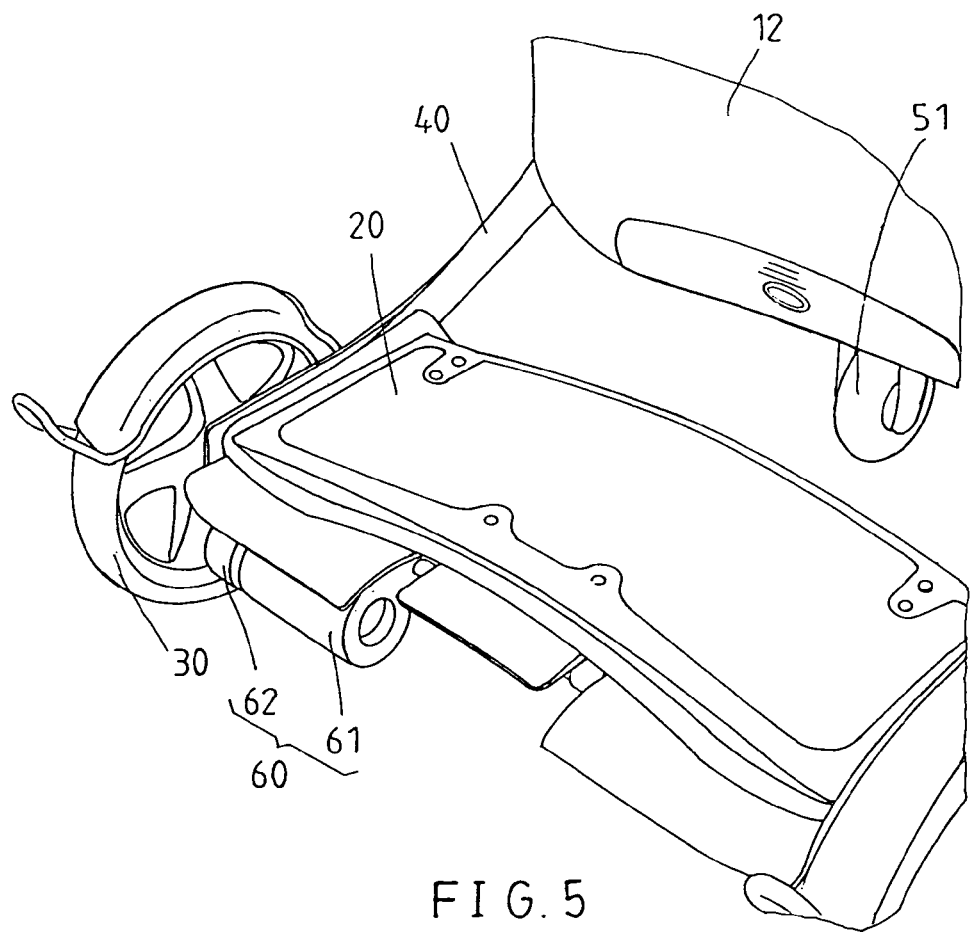
FIG. 5 is a perspective view in part of the preferred embodiment of the present invention, showing the panel member and the wheel frame in the expanded condition.
Figure 6:
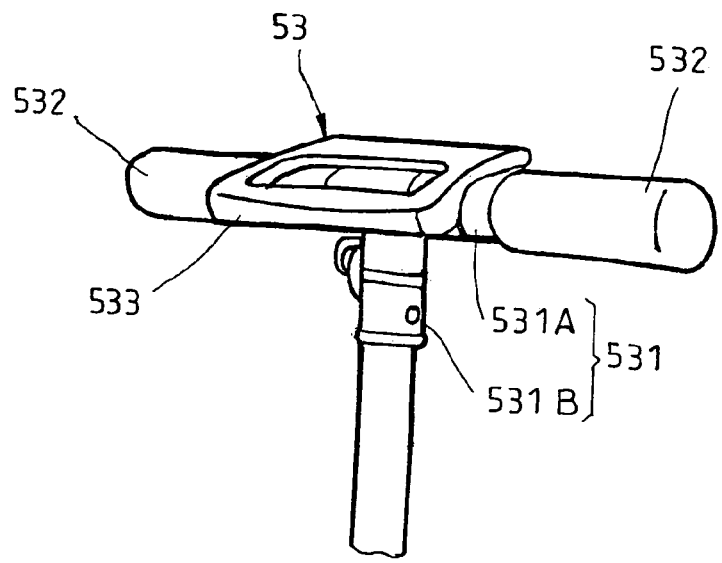
FIG. 6 is a perspective view of the handle of the preferred embodiment of the present invention, showing the bars in the expanded condition.
Figure 7:
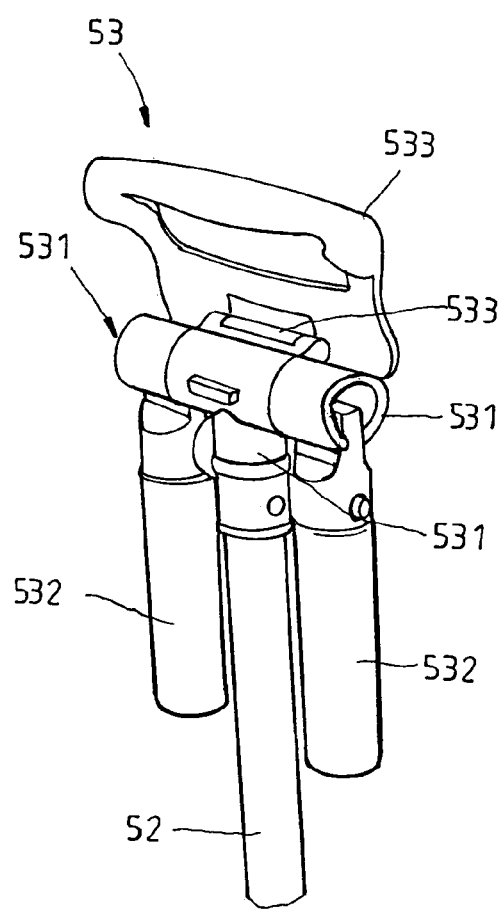
FIG. 7 is a perspective view of the handle of the preferred embodiment of the present invention, showing the bars in the folded condition.

As shown in FIG. 3, FIG. 6 and FIG. 7, the steering device 50 has a front wheel 51, a shaft 52 and a handle 53. The shaft 52 is a telescopic bar received in the hole 16 of the container 52 and opposite ends of the shaft 52 are extruded out of the top side 13 and the bottom side 14 of the container 10 respectively. The front wheel 51 is mounted on the end of the shaft 52 at the bottom side 14 of the container 10 for free rotation and the handle 53 is mounted on the end of the shaft 52 at the top side 13 of the container 10. The handle 53 has a T-shaped connector 531, two bars 532 and a grip 533. The connector 531 has a transverse member 531A and an upright member 531B and the bars 532 are pivoted on opposite ends of the transverse member 531A respectively. The bars 532 are lifted upwards for holding by user as shown in FIG. 6 and are folded downwards to be attached on the upright member 531B as shown in FIG. 7. The grip 533 is a ring member having a pivot portion 533A to be pivoted on a mid section of the transverse member 531A of the connector 531.

The driving device 60 has a motor 61, a transmission device 62 and a power (not shown). The transmission device 62 connects the motor 61 to the wheel 30 to drive the wheels 30 running. The power provides electricity to the motor 61.

In the collapsed position, the plate 21 is folded and attached on the back side 12 of the container 10 and the wheel 30 are moved to the lateral sides 15 of the container 10 respectively. In the expanded position, the plate 21 is moved downwards to a horizontal position and the wheels 30 are moved to opposite sides of the plate 21 respectively and the stop member 42 sustains the plate 21.

Figure 9A:
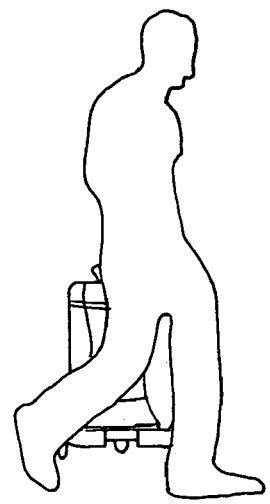
FIGS. 9A, 9B and 9C show three modes of the preferred embodiment of the present invention in operation.
Figure 9:
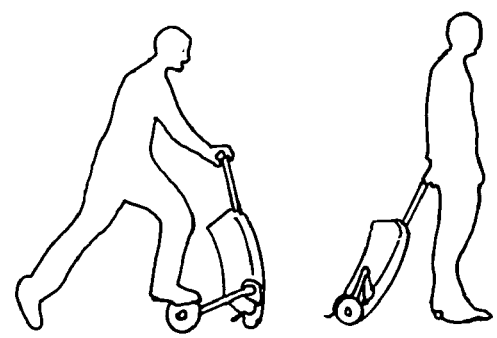

As shown in FIG. 1 and FIG. 9A, in the collapsed position, the springs 23 drive the first linkages 21 upward to attach the plate 21 on the container 10. In the meantime, the second linkages 41 are folded downwards to draw the wheels 30 to the lateral sides 15 of the container 10 respectively. The bars 532 of the handle 53 are folded downwards and the shaft 52 is telescoped to receive the handle 53 in the depression portion 161 of the container 10 but the grip 533. User can hold the grip 533 and lift the transporting device to carry it, as shown in FIG. 9A. The handle 53 also can be drawn out and user can grip the handle to draw the transporting device running on the ground, as shown in FIG. 9B.

As shown in FIG. 9C, in the expanded position, the plate 21 is expanded and the wheels 30 move out and touch the ground. The handle 53 is drawn out from the depression portion 161 and the bars 532 are unfolded. User can stand on the plate 21 by single foot or both feet and hold the handle 53 to control the direction to go.

The wheels 30 are folded to the lateral sides 15 of the container 10 that does not take any space of the chamber of the container 10 to store goods. The diameters of the wheels 30 can be equal to the width of the lateral side 15, which means the wheels 30 of the present invention are bigger to provide a balance condition. The wheels 30 always have portions extruded out of bottom side 14 of the container 10 in both of the expanded condition and collapsed condition (seeing FIG. 1 to FIG. 3). In other words, the wheels 30 are located at same level in the expanded condition and collapsed condition.

In the specification of the present invention, we only provide a few of preferred embodiments. The scope of the present invention should not be restricted in the preferred embodiment. Any equivalent designation should be still in the scope of the present invention.

What is claimed is:

1. A transporting device, comprising:
    a container;
    a panel member having a plate and two first linkages, wherein ends of the first linkages are pivoted on the plate and on opposite lateral sides of the container respectively to be moved between a collapsed position, in which the plate is attached on the container, and an expanded position, in which the plate is moved apart from the container;
    a wheel frame having two second linkages and a stop member, wherein ends of the second linkages are pivoted on mid sections of the first linkages respectively and the stop member is fixed on the second linkage to sustain the plate while the panel member is moved to the expanded position;
    two wheels mounted on the second linkages respectively for free rotation, and
    a front wheel at a bottom side of the container for free rotation;
    wherein the wheels are moved to the lateral sides of the container respectively via the second linkages while the panel member is moved to the collapsed position and the wheels are moved apart from the container via the second linkages while the panel member is moved to the expanded position.

2. The transporting device as defined in claim 1, further comprising a shaft and a handle, wherein the shaft is pivoted on the container with the front wheel pivoted on a bottom end and the handle mounted on a top end.

3. The transporting device as defined in claim 2, wherein the shaft is a telescopic bar.

4. The transporting device as defined in claim 3, wherein the handle has a connector having a transverse member and an upright member, two bars pivoted on opposite ends of the transverse member of the connector to be bent downwards and lifted upwards and a grip mounted on a mid section of the transverse member of the connector.

5. The transporting device as defined in claim 1, further comprising a driving device having a motor, a transmission device and a power, wherein the transmission device connects the motor with the wheel and the power provides electricity to the motor.

6. The transporting device as defined in claim 1, wherein a distance between the stop member and a connection position of first linkage and the second linkage is identical to a distance between the plate and the connection position of first linkage and the second linkage.

* * * * *